United States Patent [19]
Nakazeki et al.

[11] Patent Number: 5,350,283
[45] Date of Patent: Sep. 27, 1994

[54] CLEAN PUMP

[75] Inventors: Tsugito Nakazeki; Hiroyoshi Ito, both of Shizuoka, Japan

[73] Assignee: NTN Corporation, Osaka, Japan

[21] Appl. No.: 981,684

[22] Filed: Nov. 25, 1992

[30] Foreign Application Priority Data

Dec. 4, 1991 [JP] Japan .................. 3-320420
Jun. 26, 1992 [JP] Japan .................. 4-169553

[51] Int. Cl.⁵ .......................................... F04B 17/00
[52] U.S. Cl. .................. 417/423.7; 417/420; 310/90.5
[58] Field of Search .............. 417/420, 423.7; 310/90.5

[56] References Cited

U.S. PATENT DOCUMENTS

| | | | |
|---|---|---|---|
| 3,107,310 | 10/1963 | Carriere . | |
| 3,575,536 | 4/1971 | Jacobs | 417/420 |
| 4,312,628 | 1/1982 | Yamamura | 310/90.5 |
| 4,523,896 | 6/1985 | Lhenry et al. | 310/90.5 |
| 4,642,036 | 2/1987 | Young | 417/353 |
| 4,688,998 | 8/1987 | Olsen et al. | 417/356 |
| 4,763,032 | 8/1988 | Bramm et al. | 310/90.5 |
| 4,806,080 | 2/1989 | Mizobuchi et al. | 417/353 |
| 4,841,184 | 6/1989 | Chen | 310/90.5 |
| 4,944,748 | 7/1990 | Bramm et al. | 623/3 |
| 4,948,348 | 8/1990 | Doll et al. | 417/365 |
| 4,984,972 | 1/1991 | Clausen et al. | 417/420 |
| 5,112,202 | 5/1992 | Oshima et al. | 417/423.7 |

FOREIGN PATENT DOCUMENTS 3-229987 10/1991 Japan .

*Primary Examiner*—Richard A. Bertsch
*Assistant Examiner*—Peter Korytnyk
*Attorney, Agent, or Firm*—Lowe, Price, LeBlanc & Becker

[57] ABSTRACT

In a clean pump of the present invention, a magnetic coupling is formed by a permanent magnet attached to a rotor and a permanent magnet attached to an impeller, with a combined electromagnet arranged to be opposed to a soft iron member of the impeller at the side opposite to the rotor. The combined electromagnet is provided with a permanent magnet arranged at one side of its core and two coils wound around the permanent magnet. These coils are zero-power controlled by a control circuit based on outputs of position sensors such that the impeller is supported approximately at the center of a casing by an attracting force of the permanent magnets and an attracting force of the permanent magnet of the combined electromagnet.

7 Claims, 6 Drawing Sheets

CLEAN PUMP

BACKGROUND OF THE INVENTION

1. Field of the Invention

The present invention relates generally to clean pumps. More particularly, the present invention relates to clean pumps which are provided with an impeller held and rotated at a predetermined position in a casing by magnetic action from outside the casing and applicable to semiconductor manufacturing technologies and medical instruments.

2. Description of the Background Art

A centrifugal pump, in which pressure is increased through a rotary motion of fluid responsive to the rotation of an impeller, is widely used in the industrial field.

FIG. 1 is a vertical section of a clean pump proposed in Japanese Patent Laying-Open No. 3-229987 by the inventor of the present application. With reference to FIG. 1, an impeller 3 is provided in a casing 2 of a pump 1. Casing 2 is made of a non-magnetic member, while impeller 3 includes a non-magnetic member 5 having a permanent magnet 4 forming a passive magnetic bearing, and a soft iron member 6 equivalent to a rotor of an active magnetic bearing. Permanent magnet 4 is divided in the direction of the circumference of impeller 3, adjacent portions of which are magnetized in opposite poles to each other. A rotor 8 supported by a shaft 7 is provided outside casing 2 so as to be opposed to the side of permanent magnet 4 of impeller 3. Rotor 8 is driven to rotate by a motor (not shown). Rotor 8 is provided with the same number of permanent magnets 9 as that of permanent magnets 4 of impeller 3 so as to be opposed to the same and to cause an attracting force. Attached to be opposed to the side of iron member 6 of impeller 3 is an electromagnet 10 which acts to hold impeller 3 at the center of casing 2 against attracting forces of permanent magnets 4 and 9.

In thus structured clean pump, permanent magnet 9 buried in rotor 8 drives and radially supports impeller 3 to produce an axial attracting force between permanent magnet 9 and permanent magnet 5. Current is conducted through a coil of electromagnet 10 so as to maintain the balance between the attracting force, thereby floating impeller 3. Then, when rotor 8 is rotated, permanent magnets 4 and 9 form a magnetic coupling to rotate impeller 3, whereby fluid goes out from an outlet port (not shown). Since impeller 3 is separated from rotor 8 by casing 2 and will not be contaminated by electromagnet 10, the fluid from pump 1 remains clean.

The smaller the attracting force of the magnetic coupling between permanent magnets 4 and 9, the less amount of current flows through the coil of electromagnet 10 to generate less heat and consume less power. However, a reduced attracting force is not practical because it involves reduction of a driving force of the magnetic coupling and a radial rigidity. In order to increase a driving force required and a radial rigidity, current of more than a fixed amount should be conducted through the coil of electromagnet 10, resulting in an increase in heat generation and power consumption.

SUMMARY OF THE INVENTION

A principal object of the present invention is therefore to provide a clean pump allowing a current consumed by a controllable bearing to be reduced, a radial rigidity to be increased and a necessary driving force to be obtained.

In short, the present invention relates to a clean pump provided with a ring-shaped rotary impeller disposed in a case member, and a rotor provided at one side of the impeller, with the case member provided therebetween. The rotor and the impeller are radially supported by a passive radial magnetic bearing. Provided at the other side of the impeller is an active magnetic bearing formed of a combined electromagnet including a permanent magnet and an electromagnet, the active magnetic bearing being zero-power-controlled by a control circuit.

According to the present invention, therefore, zero-power-control of the combined electromagnet achieves a necessary driving force, increases a radial rigidity and reduces power consumption.

According to a preferred embodiment of the present invention, a permanent magnet is provided at a part of a yoke where a combined magnet is formed with a first coil wound for increasing a magnetomotive force of the combined magnet including a magnetomotive force of the permanent magnet and a second coil wound for reducing the magnetomotive force.

According to another preferred embodiment of the present invention, a plurality of position sensors are provided between a plurality of combined electromagnets and sensor outputs are applied as first feedback signals to a control circuit. The control circuit includes a comparing circuit for comparing an externally applied position setting signal and the first feedback signals and second feedback signals, a PID control circuit for controlling a phase and a gain of an output signal of the comparing circuit, an integration circuit for integrating an output signal of the PID control circuit and applies the integrated output signal as a second feedback signal to the comparing circuit, a first amplifying circuit for amplifying only a positive signal component extracted from the output signal of the PID control circuit to drive a first coil, and a second amplifying circuit for amplifying only a negative signal component from the output signal of the PID control circuit to drive a second coil.

According to a further preferred embodiment of the present invention, either the impeller or the case member is formed to slant such that a clearance between the impeller and the case member is increased toward the outer diameter of the impeller.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
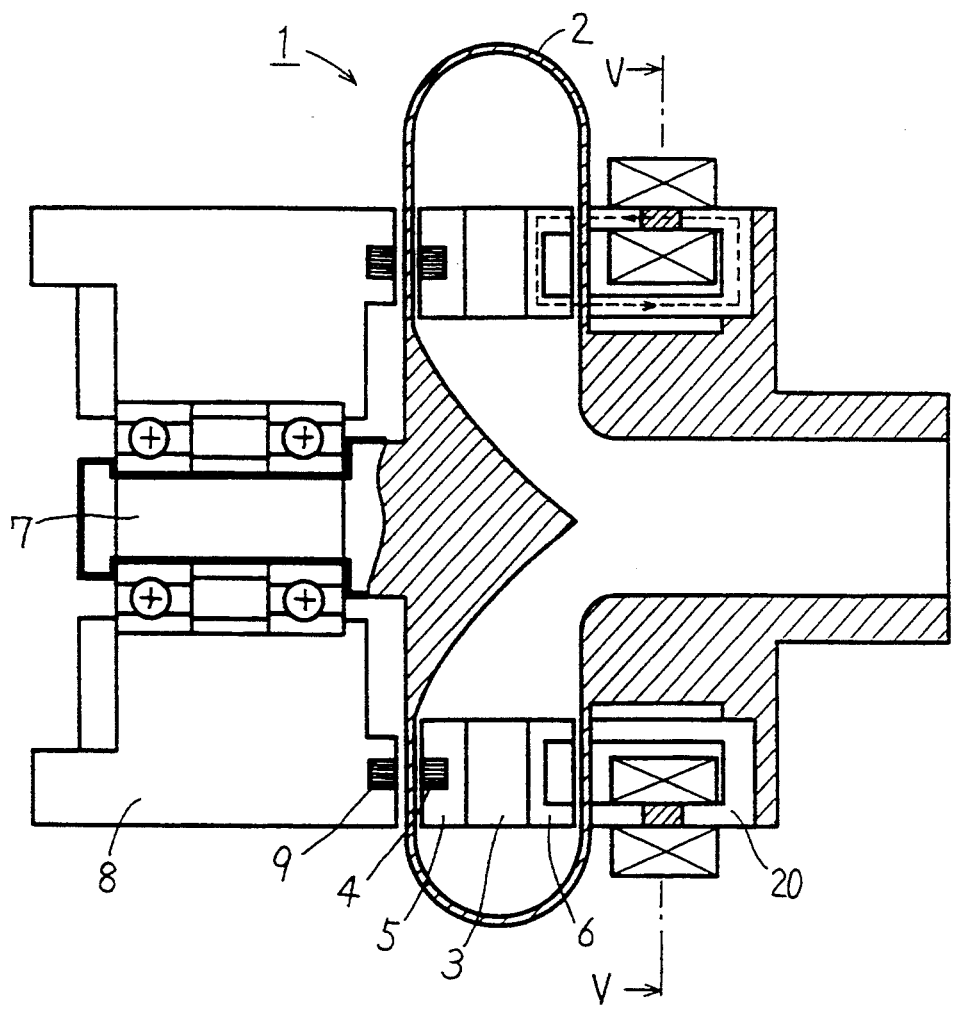
FIG. 2 is a vertical section of one embodiment of the present invention.
Figure 3:
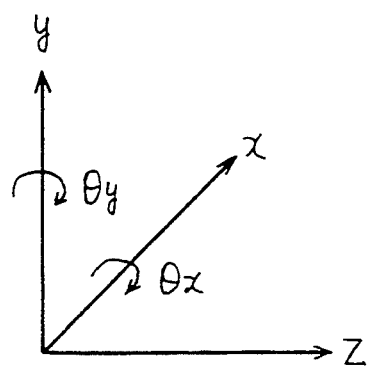
FIG. 3 is a diagram showing coordinate axes for controlling the impeller shown in FIG. 2.
Figure 4A:
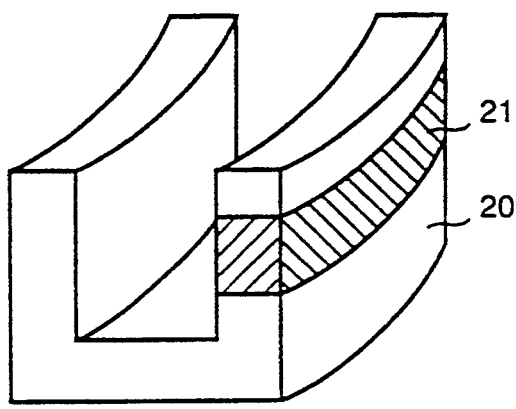
FIG. 4 is a schematic diagram showing a combined electromagnet shown in FIG. 2.
Figure 4B:
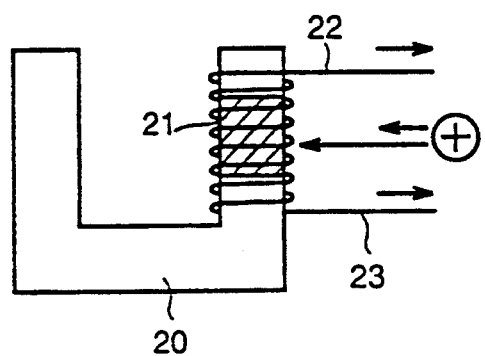
Figure 5:
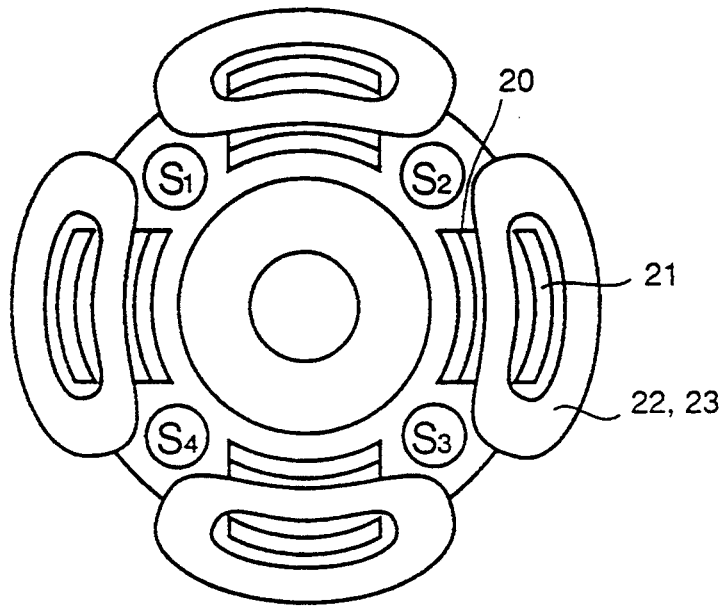
FIG. 5 is a vertical section taken along line V—V of FIG. 2.

FIG. 2 is a sectional view of one embodiment of the present invention, FIG. 3 is a diagram showing coordinates for controlling the impeller shown in FIG. 2, FIG. 4 is a schematic diagram showing a core of an electromagnet shown in FIG. 2 and FIG. 5 is a vertical section taken along line V—V of FIG. 2.

Figure 1:
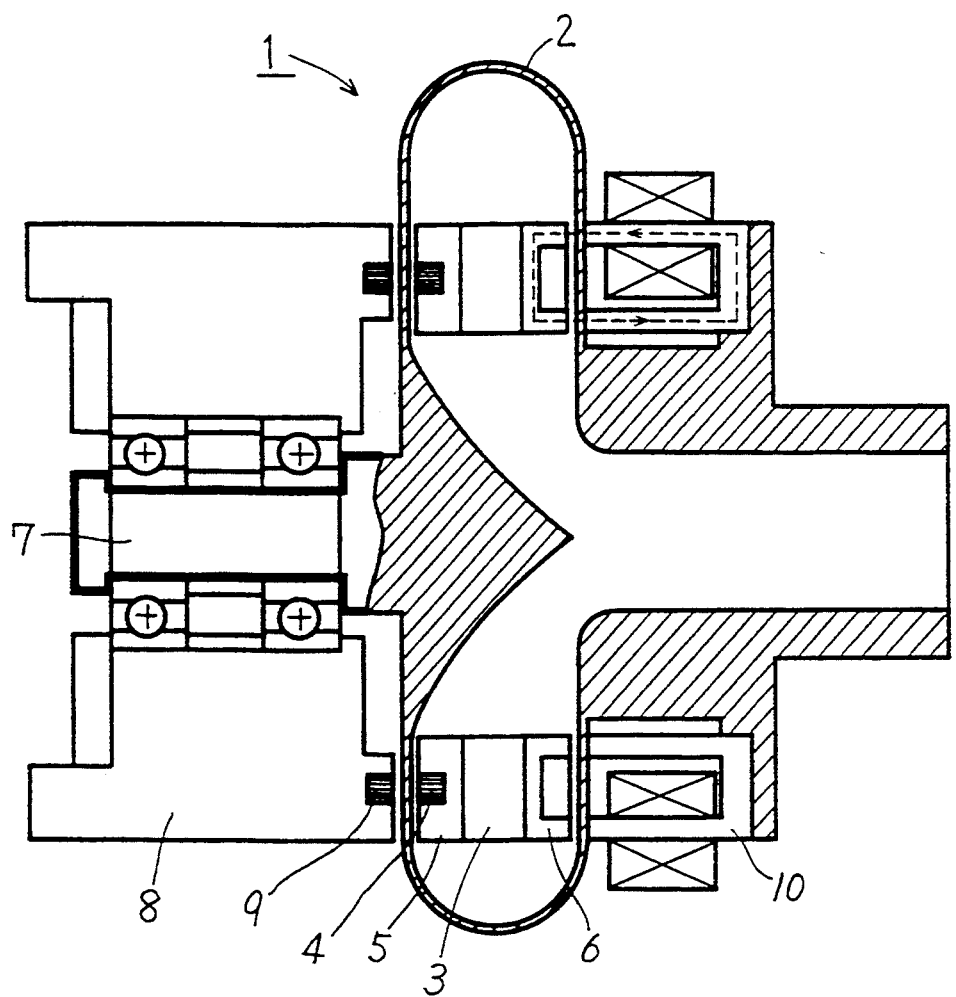
FIG. 1 is a vertical section of a conventional clean pump.

First with reference to FIG. 2, a clean pump 1 is formed similarly to the above-described clean pump shown in FIG. 1 except for an electromagnet 20. Electromagnet 20 is provided with a permanent magnet 21 at a yoke on one side of an U-shaped core made of a ferromagnetic material, with coils 22 and 23 wound as shown in FIG. 4. The coils are connected so as to increase a magnetomotive force of a combined electromagnet including a magnetomotive force of permanent magnet 21 when the current flows through coil 22, and reduce the magnetomotive force when the current flows through coil 23.

Combined electromagnet 20 is designed and spaced apart from a soft iron member 6 such that a resultant force of forces for attracting impeller 3 is approximately equal to a force of permanent magnets 4 and 9 for attracting the impeller when no current flows through the coil. Position sensors S1-S4 are arranged between electromagnets 20 as shown in FIG. 5. These position sensors S1-S4 sense gaps between combined electromagnet 20 and soft iron member 6. The detection output is applied to a control circuit 30 shown in FIG. 6 which will be described later, to control z, $\theta_x$ and $\theta_y$ shown in FIG. 3, thereby holding impeller 3 approximately at the center of casing 2.

Figure 6:
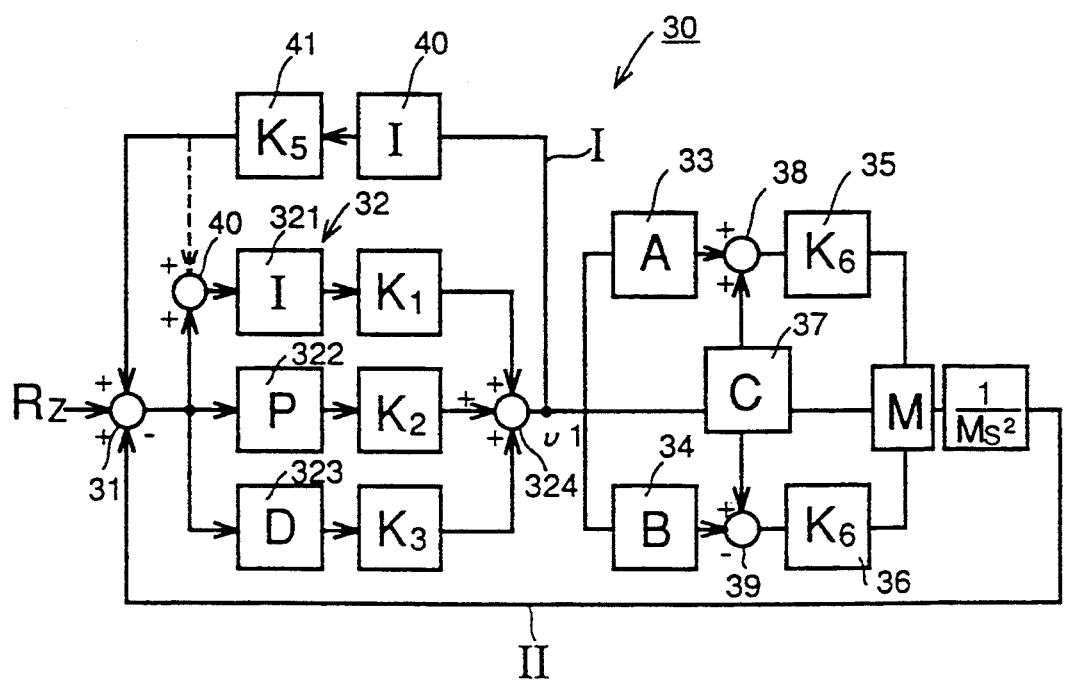
FIG. 6 is a block diagram of a control circuit included in the first embodiment.

FIG. 6 is a block diagram of a control circuit according to one embodiment of the present invention. With reference to FIG. 6, zero-power control in the embodiment of the present invention will be described. Out of outputs of the four position sensors S1, S2, S3 and S4 shown in FIG. 5, the combined electromagnets are controlled for each control axis, with (S1+S2+S3+S4) as a feedback input of z axis control, (S1+S2)−(S3+S4) as a feedback input of $\theta_x$ and (S1+S4)−(S2+S3) as a feedback input of $\theta_y$.

As an example, control for the z axis will be described. With (S1+S2+S3+S4) as a feedback input of the z axis, an externally applied position setting signal Rz and a feedback input II are compared by a comparator 31 and amplified to be applied to a PID controller 32 when there exists no loop I in a control circuit 30 shown in FIG. 6. PID controller 32 includes an integration circuit 321, a proportion circuit 322, a differentiating circuit 323 and an addition circuit 324 for adding these outputs. Then, PID controller 32 adjusts a phase and a gain of a voltage $v_1$ for output. The voltage $v_1$ is applied to an A circuit 33 and a B circuit 34. A circuit 33 outputs only a positive signal component of the voltage $v_1$, while B circuit 34 outputs only a negative signal component. In other words, when a positive deviation is large with respect to a set value, an output of A circuit 33 is amplified by an amplifier 35 to be converted into a force by $K_6$, which force acts to increase an electromagnetic force of combined electromagnet 20, thereby affecting the mass M of impeller 3 to cause impeller 3 to be attracted to combined electromagnet 20.

On the other hand, with a negative deviation being large with respect to a set value, an output of B circuit 34 is amplified by an amplifier 36 and converted into a force which reduces the electromagnetic force of combined electromagnet 20 to act to cause impeller 3 to go away from combined electromagnet 20. When the voltage $v_1$ approximates to zero, a C circuit 37 applies a bias current for eliminating a neutral zone of an electromagnetic force to the outputs of A circuit 33 and B circuit 34 through adders 38 and 39, respectively. In other words, when the voltage $v_1$ is zero, while currents of the same value flow through the two coils 22 and 23 shown in FIG. 4(a), the attracting force of combined electromagnet 20 remains of the same value as that of the attracting force of permanent magnet 21 only. M represents mass of the impeller.

With the loop I established, a voltage $v_1$ of the output of adder 324 in PID controller 32 is integrated by an integrator 40, amplified by an amplifier 41 by $K_5$ and added to a set value in comparator 31. In other words, an initial set value is updated and a distance between combined electromagnet 20 and impeller 3 is shortened to balance the attracting force between permanent magnets 4 and 9 as shown in FIG. 2 with an attracting force of permanent magnet 21. This operation is referred to as zero power control. Then, when the deviation goes positive or negative due to dynamic disturbance, current flows through coil 22 or 23 as described above to control impeller 3 to maintain its dynamic stability.

Since a positional change of impeller 3 by zero power control falls within casing 2, when impeller 3 moves greatly, it comes in contact with the inner surface of casing 2. In order to avoid such contact, amplifier 41 includes a limit circuit for preventing impeller 3 from coming into contact with the inner surface of casing 2. In addition, a time constant of integrator 40 is selected to be larger than that of integrator 321 in PID controller 32. Furthermore, a set value for zero power control can be also changed by addition indicated by a dotted line of FIG. 6. In other words, with an adder 40 provided at a preceding stage to integrator 321, an output of comparator 31 is applied to adder 40 wherein the output is added to an output of amplifier 41, and the addition is applied to integrator 321.

When impeller 3 is located at the center of casing 2, an attracting force of a coupling magnet for rotation and an attracting force of combined electromagnet 20 should be adjusted to be approximately the same when no current flows. In addition, coupling for rotation may be implemented by a rotary magnetic field.

According to the embodiment of the present invention as is described above, a combined electromagnet formed with a permanent magnet provided at a part of a yoke of an active type magnetic bearing is used for zero power control, it is possible to obtain a necessary driving force and increase a radial rigidity while reducing current to be consumed.

Figure 7:
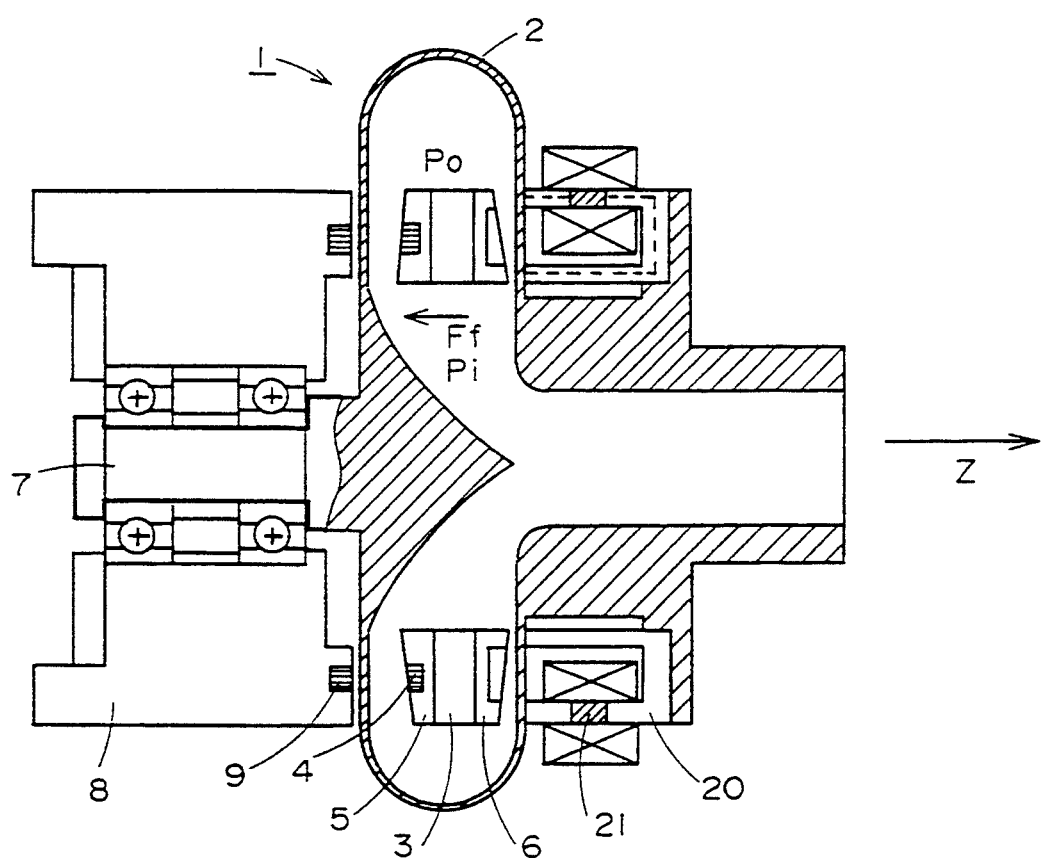
FIG. 7 is a diagram showing a configuration of a clean pump which causes malfunction.

FIG. 7 is a diagram illustrating a configuration of a clean pump of the present invention which causes malfunction. When a clearance between impeller 3 and casing 2 becomes larger in a radial direction outwards impeller 3 due to error in manufacturing, a discharge pressure $P_0$ of pump 1 becomes high. As a result, a fluid pressure at a position where an average clearance is smaller, is increased as shown in FIG. 7 due to wedging action of a fluid pressure from the outer circumferential side. The rise of the fluid pressure applies a leftward force Ff to impeller 3. Although a rightward force is applied to impeller 3 to balance the force by the attracting forces of permanent magnets 4 and 9 during zero power control, the wedging action of the fluid pressure is further increased to enhance the leftward force Ff. As a result, the control system goes unstable. An embodiment for eliminating such shortcoming will be described in the following.

Figure 8:
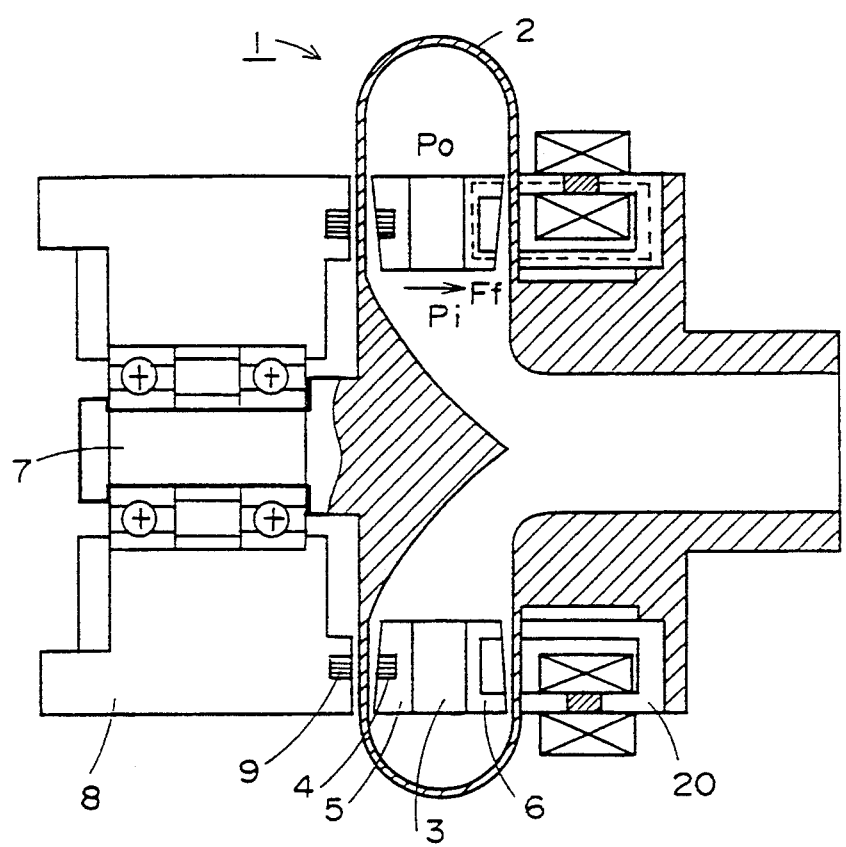
FIG. 8 is a vertical section of a clean pump improved not to cause malfunction.

FIG. 8 is a sectional view of a main part of another embodiment of the present invention. The embodiment shown in FIG. 8 is structured to have right-side and left-side clearances between casing 2 and impeller 3 become larger in a radial direction inwards impeller 3 in consideration of processing error. With thus structured embodiment, it is assumed that a fluid pressure onto impeller 3 acts rightward as Ff. At this time, impeller 3 moves leftward by being subjected to zero power control. Under the zero power control, the left-side clearance changes from large to small, whereby Ff caused by the fluid pressure changes from large to small to stop at a stable point. When the right-side clearance is larger, impeller 3 will not be moved further leftward.

In the embodiment shown in FIG. 8, while both side surfaces of impeller 3 opposed to casing 2 are formed slanting such that each clearance between impeller 3 and casing 2 becomes smaller toward a pump outlet side (outwardly), one surface of impeller 3 may be in parallel.

As described above, according to another embodiment of the present invention, since at least one of clearances between the impeller and the pump casing is formed to become narrower outwardly in the pump, Ff acting on the impeller is automatically balanced to achieve stable zero power control.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A clean pump comprising:
 a case member,
 a ring-shaped impeller rotatable about a rotational axis in said case member,
 a rotatable rotor provided opposed to one side of said impeller with said case member provided therebetween,
 passive radial magnetic bearings one provided at said one side of said impeller and the other provided at a side of said rotor opposed to said impeller for radially supporting said impeller,
 an active magnetic bearing including a plurality of combined electromagnets and a permanent magnet disposed opposed to the other side of said impeller with said case member provided therebetween and an electromagnet, for controlling the rotation of said impeller about an axis perpendicular to said rotational axis, and
 controlling means for zero-power controlling said active magnetic bearing.

2. The clean pump according to claim 1, wherein said controlling means includes means for controlling said electromagnet such that said impeller is supported approximately at the center of said case member by magnetic forces of said passive radial magnetic bearing and the permanent magnets included in said active magnetic bearing.

3. The clean pump according to claim 1, wherein said combined electromagnet includes:
 a yoke,
 a first coil for increasing a magnetomotive force of a combined electromagnet including a magnetomotive force of said permanent magnet and a second coil for reducing the magnetomotive force, both of which are wound around said yoke, and
 a permanent magnet provided at a part of said yoke.

4. The clean pump according to claim 3, further including at least three of a plurality of position sensors provided between said plurality of combined electromagnets for applying respective detection outputs as first feedback signals to said controlling means, wherein said controlling means includes,
 comparing means for comparing an externally applied position setting signal and said first feedback signal and a second feedback signal,
 PID controlling means for controlling a phase and a gain of an output signal of said comparing means,
 integrating means for integrating the output signal of said PID controlling means and applying the integrated signal as the second feedback signal to said comparing means,
 first amplifying means for amplifying only a positive signal component extracted from the output signal of said PID controlling means to drive said first coil, and
 second amplifying means for amplifying only a negative signal component extracted from the output signal of said PID controlling means to drive said second coil.

5. The clean pump according to claim 4, further including limiting means for limiting the output signal of said integrating means.

6. The clean pump according to claim 4, further including bias signal adding means for adding a bias signal to the output signals of said first and second amplifying means.

7. The clean pump according to claim 1, wherein at least either of said one side and said other side of the impeller is formed slanting such that a clearance between said impeller and said case member becomes narrower toward the pump outlet side.

* * * * *